(12) United States Patent
Shin et al.

(10) Patent No.: US 12,074,970 B2
(45) Date of Patent: Aug. 27, 2024

(54) QUANTUM KEY DISTRIBUTION METHOD, DEVICE, AND SYSTEM

(71) Applicant: KT CORPORATION, Gyeonggi-do (KR)

(72) Inventors: Jeonghwan Shin, Seoul (KR); Kyung-Woon Lee, Seoul (KR); Min Soo Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 267 days.

(21) Appl. No.: 17/615,375

(22) PCT Filed: Jun. 17, 2020

(86) PCT No.: PCT/KR2020/007846
§ 371 (c)(1),
(2) Date: Nov. 30, 2021

(87) PCT Pub. No.: WO2020/256408
PCT Pub. Date: Dec. 24, 2020

(65) Prior Publication Data
US 2022/0231845 A1     Jul. 21, 2022

(30) Foreign Application Priority Data

Jun. 17, 2019  (KR) .................. 10-2019-0071799
Sep. 30, 2019  (KR) .................. 10-2019-0120521

(51) Int. Cl.
*H04L 9/08* (2006.01)
*G02B 5/30* (2006.01)
(Continued)

(52) U.S. Cl.
CPC .......... *H04L 9/0858* (2013.01); *G02B 5/3025* (2013.01); *G02B 27/283* (2013.01);
(Continued)

(58) Field of Classification Search
CPC .... G02B 27/28; G02B 27/283; G02B 27/286; G02B 5/30; G02B 5/3025; H04B 10/50;
(Continued)

(56) References Cited

U.S. PATENT DOCUMENTS 6,438,234 B1   8/2002 Gisin et al.
7,907,850 B2   3/2011 Tanaka et al.
(Continued)

FOREIGN PATENT DOCUMENTS

CN    1651947 A    8/2005
CN  101150371 A    3/2008
(Continued)

OTHER PUBLICATIONS

European Patent Office, European Search Report of corresponding EP Patent Application No. 20826046.3, Jun. 9, 2023.
(Continued)

*Primary Examiner* — D'Arcy Winston Straub
(74) *Attorney, Agent, or Firm* — IP Legal Services, LLC (57) ABSTRACT

Provided are a quantum key distribution method, device, and system. The quantum key distribution system may include a transmitter configured to split an optical signal into a first optical signal passing through a first path (P1) and a second optical signal passing through a second path (P2), which is longer than the first path (P1), and to sequentially transmit the first optical signal and the second optical signal; and a receiver configured to receive the first optical signal and the second optical signal incident through a quantum channel and transmit the first optical signal and the second optical signal back to the transmitter through the quantum channel after passing through a polarization-dependent element, being reflected by a Faraday mirror, and passing through the polarization-dependent element again.

11 Claims, 8 Drawing Sheets

(51) Int. Cl.
  *G02B 27/28* (2006.01)
  *H04B 10/532* (2013.01)
  *H04B 10/70* (2013.01)

(52) U.S. Cl.
  CPC ........... *H04B 10/532* (2013.01); *H04B 10/70* (2013.01); *H04L 9/0827* (2013.01); *G02B 27/286* (2013.01); *H04L 9/0852* (2013.01)

(58) Field of Classification Search
  CPC .... H04B 10/516; H04B 10/532; H04B 10/70; H04L 9/08; H04L 9/0816; H04L 9/0819; H04L 9/0827; H04L 9/0852; H04L 9/0858
  See application file for complete search history.

(56) References Cited

U.S. PATENT DOCUMENTS

| | | | |
|---|---|---|---|
| 8,331,797 | B2 | 12/2012 | Han et al. |
| 8,433,070 | B2 | 4/2013 | Habif |
| 2006/0239460 | A1 | 10/2006 | Young |
| 2007/0248229 | A1 | 10/2007 | Kawamoto et al. |
| 2008/0037998 | A1 | 2/2008 | Zhengfu et al. |
| 2009/0150561 | A1 | 6/2009 | Vig |
| 2009/0180615 | A1* | 7/2009 | Trifonov ................ H04B 10/70 380/278 |
| 2010/0002881 | A1 | 1/2010 | Youn et al. |
| 2010/0195831 | A1 | 8/2010 | Tanaka et al. |
| 2018/0191496 | A1* | 7/2018 | Duplinskiy ........... H04L 9/0855 |
| 2019/0312723 | A1 | 10/2019 | Guo et al. |
| 2020/0044836 | A1 | 2/2020 | Kim et al. |
| 2020/0209020 | A1 | 7/2020 | Issa et al. |

FOREIGN PATENT DOCUMENTS

| | | | |
|---|---|---|---|
| CN | 101558590 A | 10/2009 | |
| CN | 101645769 A | 2/2010 | |
| CN | 1943161 B | 5/2010 | |
| CN | 108173655 A | 6/2018 | |
| JP | 2007-251678 A | 9/2007 | |
| JP | 2007-526722 A | 9/2007 | |
| JP | 2007-535228 A | 11/2007 | |
| JP | 2011-050072 A | 3/2011 | |
| JP | 2013-255263 A | 12/2013 | |
| KR | 10-2008-0052234 A | 6/2008 | |
| KR | 10-2016-0050934 A | 5/2016 | |
| KR | 10-2018-0056204 A | 5/2018 | |
| KR | 10-2019-0053837 A | 5/2019 | |
| KR | 10-1992962 B1 | 6/2019 | |
| WO | 2005/086410 A1 | 9/2005 | |
| WO | 2007/041096 A3 | 7/2007 | |
| WO | WO-2009145392 A1 * | 12/2009 | ........... H04L 9/0858 |
| WO | 2019/018894 A1 | 1/2019 | |

OTHER PUBLICATIONS

Li Shen et al., "High-speed polarization controller for all-fiber quantum communication systems", Chinese Physical Society, 2013, Acta Phys. Sin. vol. 62, No. 8.
The State Intellectual Property Office of People's Republic of China, Office Action of corresponding CN Patent Application No. 202080049795.9, Mar. 15, 2024.
Japan Patent Office, Office Action of corresponding JP Patent Application No. 2021-574243, May 28, 2024.

* cited by examiner

QUANTUM KEY DISTRIBUTION METHOD, DEVICE, AND SYSTEM

CROSS REFERENCE TO RELATED APPLICATIONS

This application is a National Stage Patent Application of PCT International Patent Application No. PCT/KR2020/007846 (filed on Jun. 17, 2020) under 35 U.S.C. § 371, which claims priority to Korean Patent Application Nos. 10-2019-0071799 (filed on Jun. 17, 2019) and 10-2019-0120521 (filed on Sep. 30, 2019), the teachings of which are incorporated herein in their entireties by reference.

TECHNICAL FIELD

The present disclosure relates to a quantum key distribution method, a quantum key distribution device, and a quantum key distribution system and, more particularly, to a quantum key distribution method, a quantum key distribution device, and a quantum key distribution system for controlling a polarization-dependent element provided in a receiver of the quantum key distribution system using a one-time continuous control signal to drive the same independently of polarization.

BACKGROUND ART

Recently, individuals or countries have suffered damage caused by wiretapping and eavesdropping therebetween, and there is a significantly growing interest in security. However, typical secure communication has a serious risk that communication content may be exposed by external attacks. To compensate for the shortcomings of the typical secure communication method, quantum cryptography communication has been introduced and spotlighted as a next-generation security technology. The quantum cryptography can theoretically guarantee very high security.

Accordingly, many studies have been actively conducted on quantum key distribution among quantum cryptography communication technologies. Quantum key distribution (QKD) is a technology of distributing and sharing a cryptographic key between distant users using the quantum mechanical properties of photons. If an attacker attempts to take cryptographic key information distributed between the users, the cryptographic key information may be changed due to the quantum mechanical properties. Accordingly the users exchanging the cryptographic key can detect the presence of the attacker.

Specifically, quantum key distribution (QKD) transmits information using a single photon (or a quasi-single photon at a similar level to a single photon) having quantum properties to distribute a cryptographic key using a quantum state and shares the cryptographic key safely from eavesdropping using polarization and a phase among various quantum properties of photons.

Accordingly, a quantum key distribution (QKD) system includes various optical elements, and the various optical elements included in the quantum key distribution (QKD) system generally have polarization-dependent operating characteristics. Therefore, a change in polarization of photons occurring in the quantum key distribution (QKD) system has a significant impact on the performance of the quantum key distribution (QKD) system.

For example, a quantum key distribution (QKD) system distributes a cryptographic key using a phase generally. The quantum key distribution (QKD) system employs a phase modulator (PM) to load cryptographic key information on a photon. The phase modulator (PM) generally has a polarization-dependent characteristic that a phase modulation characteristic varies according to the polarization state of a photon.

That is, the phase modulator (PM) is a device that controls the phase of a photon using a voltage or current and changes a phase control value by input polarization according to the polarization-dependent characteristic. Accordingly, when the polarization of a photon input to the phase modulator (PM) is changed, it is difficult to accurately control phase. Furthermore, because of a phase error caused by the polarization, the quantum key distribution (QKD) system does not properly generate/distribute the cryptographic key.

An intensity modulator (IM) is used to generate decoy data for detecting the presence of an attacker in a quantum key distribution (QKD) system. Such an intensity modulator is also typically polarization-dependent. Accordingly, when the polarization of a photon entering the intensity modulator (IM) is changed, the intensity modulator (IM) has difficulty in generating accurate decoy data (decoy state), which restricts a stable operation of the quantum key distribution (QKD) system.

A one-way quantum key distribution (QKD) system includes a transmitter generating a single photon and a receiver detecting the single photon. Accordingly, both the transmitter and the receiver are generally configured with an optical link and an element capable of maintaining proper polarization in order to control the characteristics of a polarization-dependent device. Furthermore, the receiver has a separate polarization correction function to correct polarization distortion that occurs in a quantum channel (optical link through which the single photon is transmitted).

A two-way quantum key distribution (QKD) system includes a transmitter generating, transmitting a single photon, and detecting the photon reflected by a receiver. The two-way quantum key distribution (QKD) system is configured to transmit an optical signal generated by the transmitter to the receiver and return the optical signal back to the transmitter through the same link in order to correct polarization distortion that occurs in a quantum channel. Accordingly, polarization distortion occurring in the transmission from the transmitter to the receiver is corrected to the same polarization as that initially occurring in the transmitter during the transmission to the transmitter through the same link.

In the two-way quantum key distribution (QKD) system, the stable operation of an interferometer disposed in the transmitter can be ensured by polarization correction using the same optical link. However, the receiver needs to correct an error caused by the polarization in using a phase modulator (PM) and an intensity modulator (IM) to generate a single photon in which cryptographic key information is encoded in the phase of the optical signal using the optical signal received from the transmitter.

In order to correct the error in the two-way system, the receiver repeats control on the element twice with respect to an optical signal entering the receiver and an optical signal existing from the receiver by using an element that generates an error in proportion to the degree of polarization distortion of the input optical signal in order to control the polarization distortion.

Such a typical method as described above needs to generate two control signals operating at high speed and needs to control the polarization-dependent device twice at high speed at the time when the entering optical signal and the exiting optical signal do not overlap.

DISCLOSURE OF INVENTION

Technical Problem

Therefore, the present disclosure has been made in view of the above-mentioned problems, and an aspect of the present disclosure is to provide a quantum key distribution method, a quantum key distribution device, and a quantum key distribution system for correcting an error due to a polarization-dependent characteristic by controlling a polarization-dependent element using a one-time continuous control signal when a device is configured using the polarization-dependent element in the quantum key distribution (QKD) system in which an optical signal travels back and forth through the same optical link as in a two-way structure.

Other specific aspects of the present disclosure will be clearly identified and understood by an expert or a researcher in this technical field through the detailed content to be described below.

Solution to Problem

According to an embodiment of the present disclosure, a quantum key distribution system 100 for distributing a quantum cryptographic key to a transmitter 110 and a receiver 120 includes: the transmitter 110 configured to split an optical signal into a first optical signal passing through a first path P1 and a second optical signal passing through a second path P2, which is longer than the first path P1, and to sequentially transmit the first optical signal and the second optical signal; and the receiver 120 configured to receive the first optical signal and the second optical signal incident through a quantum channel 130 and transmit the first optical signal and the second optical signal back to the transmitter 110 through the quantum channel 130 after passing through a polarization-dependent element 123, being reflected by a Faraday mirror 124, and pass through the polarization-dependent element 123 again, wherein a difference ($dL=L_{P2}-L_{P1}$) between a length $L_{P1}$ of the first path P1 and a length $L_{P2}$ of the second path P2 in the transmitter 110 is equal to or greater than twice a distance (=D) between the polarization-dependent element 123 and the Faraday mirror 124 ($dL \geq 2D$).

The transmitter 110 may include a light source 111 to generate an optical signal and a beam splitter 113 to split the optical signal into the first optical signal and the second optical signal, to output the first optical signal to the first path P1, and to output the second optical signal to the second path P2.

A delay line 115 extending a propagation path of the second optical signal may be provided in the second path P2.

A polarized beam splitter 116 may be provided in the transmitter 110 to polarize the first optical signal proceeding through the first path P1 to have first polarization and to polarize the second optical signal proceeding through the second path P2 to have second polarization perpendicular to the first polarization.

The polarized beam splitter 116 may enable the first optical signal transmitted from the receiver 120 to proceed to the second path P2 and may enable the second optical signal to proceed to the first path P1.

In the receiver 120, while the first optical signal or the second optical signal passes through the polarization-dependent element 123, is reflected on the Faraday mirror 124, and then passes through the polarization-dependent element 123 again, a one-time continuous control signal may be applied as a control signal for controlling an operation of the polarization-dependent element 123.

The receiver 120 may include a plurality of polarization-dependent elements 123, and the difference ($dL=L_{P2}-L_{P1}$) between the length $L_{P1}$ of the first path P1 and the length $L_{P2}$ of the second path P2 may be equal to or greater than twice a distance (=D) between one of the polarization-dependent elements 123, which is distant from the Faraday mirror 124, and the Faraday mirror 124 ($dL \geq 2D$).

The plurality of polarization-dependent elements 123 may include a first phase modulator 123a and an intensity modulator 123b, and the first phase modulator 123a may modulate only a phase of the second optical signal.

The plurality of polarization-dependent elements 123 may include a first phase modulator 123a and an intensity modulator 123b, and the intensity modulator 123b may modulate an intensity of the first optical signal and an intensity of the second optical signal.

According to another embodiment of the present disclosure, a transmitter 110 provided in a quantum key distribution system 100 to distribute a quantum cryptographic key with a receiver 120 includes: a light source 111 configured to generate an optical signal; a beam splitter 113 configured to split the optical signal into a first optical signal and a second optical signal, to output the first optical signal to a first path P1, and to output the second optical signal to a second path P2; and a delay line 115 provided in the second path P2 to extend a propagation path of the second optical signal, wherein a difference ($dL=L_{P2}-L_{P1}$) between a length $L_{P1}$ of the first path P1 and a length $L_{P2}$ of the second path P2 is equal to or greater than twice a distance (=D) between a polarization-dependent element 123 and a Faraday mirror 124 provided in the receiver 120 ($dL \geq 2D$).

According to still another embodiment of the present disclosure, a receiver 120 provided in a quantum key distribution system 100 to distribute a quantum cryptographic key with a transmitter 110 includes: a polarization-dependent element 123 having an operation characteristic changes depending on polarization of an optical signal; and a Faraday mirror 124 configured to reflect an entering optical signal by rotating polarization of the optical signal by 90 degrees, wherein, when the transmitter 110 generates an optical signal, splits into a first optical signal passing through a first path P1 and a second optical signal passing through a second path P2, which is longer than the first path P1, and transmits the first optical signal and the second optical signal sequentially, and the receiver receives the first optical signal and the second optical signal incident through a quantum channel 130 and transmits the first optical signal and the second optical signal back to the transmitter through the quantum channel 130 after passing through the polarization-dependent element 123, being reflected on the Faraday mirror 124, and passing through the polarization-dependent element 123 again, and a difference ($dL=L_{P2}-L_{P1}$) between a length $L_{P1}$ of the first path P1 and a length $L_{P2}$ of the second path P2 in the transmitter 110 is equal to or greater than twice a distance (=D) between the polarization-dependent element 123 and the Faraday mirror 124 ($dL \geq 2D$).

Advantageous Effects of Invention

By a quantum key distribution method, a quantum key distribution device, and a quantum key distribution system according to an embodiment of the present disclosure, an error caused by a polarization-dependent characteristic is corrected by controlling a polarization-dependent element using a one-time continuous control signal in the two-way quantum key distribution (QKD) system in which an optical signal travels back and forth through the same optical link as in a two-way structure.

That is, according to the present disclosure, a polarization-dependent element used in a two-way quantum key distribution (QKD) system may be controlled not to be affected by polarization distortion occurring in a period for transmitting light inside and outside a device.

Accordingly, in the present disclosure, it is possible to control an optical signal regardless of polarization distortion in a two-way quantum key distribution (QKD) system using a polarization-dependent element.

Specifically, the quantum key distribution (QKD) system according to the present disclosure includes a receiver 120 that controls a polarization-dependent element, such as a phase modulator (PM) and an intensity modulator (IM). Accordingly, it is possible to control the polarization-dependent element independently of polarization using a one-time continuous control signal.

BRIEF DESCRIPTION OF DRAWINGS

The accompanying drawings, which are included as a part of the detailed description to help the understanding of the present disclosure, provide embodiments of the present disclosure and describe the technical spirit of the present disclosure in conjunction with the detailed description, in which.

BEST MODE FOR CARRYING OUT THE INVENTION

The present disclosure may be variously modified and may include various embodiments. Hereinafter, specific embodiments will be described in detail with reference to the accompanying drawings.

The following embodiments are provided for a comprehensive understanding of methods, devices, and/or systems described herein. However, these embodiments are provided merely for illustration, and the present disclosure is not limited thereto.

When detailed descriptions about a known technology related to the present disclosure are determined to make the gist of the present disclosure unclear in describing embodiments of the present disclosure, the detailed descriptions will be omitted herein. Furthermore, terms used below are defined in view of functions in the present disclosure and may thus be changed depending on a user, the intent of an operator, or the custom. Accordingly, the terms should be defined on the basis of the following overall description of this specification. The terminology used in the detailed description is for describing embodiments of the present disclosure only and is not intended to limit the present disclosure. Unless clearly used otherwise, singular forms are intended to include plural forms. It will be understood that the expression "include" or "comprise," when used in this description, specify the presence of stated features, integers, steps, operations, elements, or some or combinations thereof, but do not preclude the presence or addition of one or more other features, integers, steps, operations, elements, or some or combinations thereof.

Although the terms "first", "second", and the like may be used to describe various components, these components should not be limited by these terms. These terms are used only to distinguish one component from another component.

Hereinafter, exemplary embodiments of the present disclosure will be described in detail with reference to the accompanying drawings.

Figure 1:
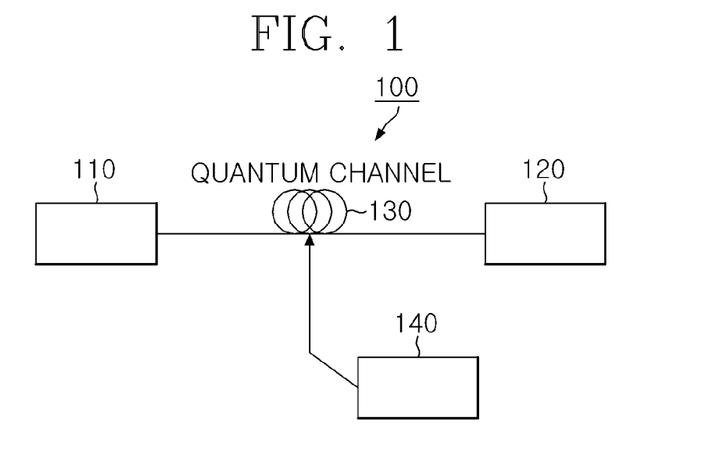
FIG. 1 and FIG. 2 illustrate a quantum key distribution system 100 according to an embodiment of the present disclosure.

FIG. 1 illustrates a quantum key distribution system 100 according to an embodiment of the present disclosure.

As illustrated in FIG. 1, the quantum key distribution system 100 according to the embodiment of the present disclosure may include a transmitter 110, a receiver 120, and a quantum channel 130. The transmitter 110 and the receiver 120 generate and share a quantum cryptographic key by exchanging optical signals through the quantum channel 130

Here, the transmitter 110 and the receiver 120 may be servers, clients or terminals connected to a server, communication devices, such as gateways or routers, or portable devices having mobility. The transmitter 110 and the receiver 120 may be configured using various devices capable of communication by generating and sharing a quantum key.

The quantum channel 130 is provided between the transmitter 110 and the receive 120 to transmit an optical signal. While the quantum channel 130 may be configured using an optical fiber, the present disclosure is not necessarily limited thereto, and any medium capable of transmitting an optical signal may be used to configure the quantum channel 130.

Accordingly, the transmitter 110 and the receiver 120 may exchange information necessary to generate the quantum cryptographic key using the phase, polarization, and the like of the optical signal according to various protocols, such as the BB84 protocol. Further, the transmitter 110 and the receiver 120 may generate and share the quantum cryptographic key, thereby effectively preventing an attacker 140 from stealing the quantum cryptographic key and attempting to hack the quantum cryptographic key.

Furthermore, a quantum cryptographic communication system may perform communication while performing encryption and decryption using the quantum cryptographic key generated in the quantum key distribution system 100, thereby enhancing the security of the communication system.

Figure 2:
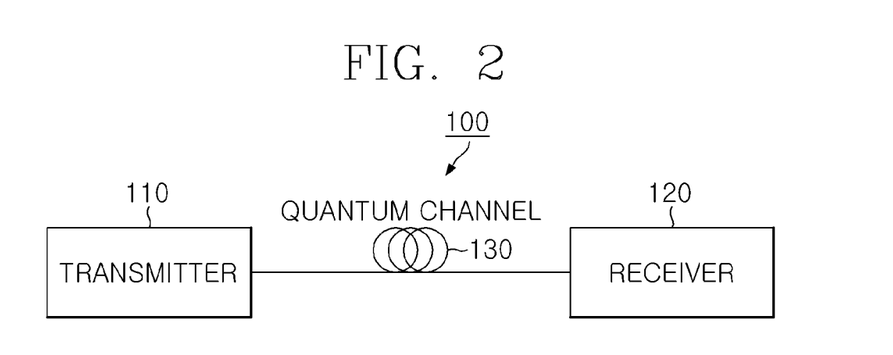

FIG. 2 is a block diagram illustrating a quantum key distribution system 100 according to an embodiment of the present disclosure. As illustrated in FIG. 2, the quantum key distribution system 100 according to the embodiment of the present disclosure distributes a quantum cryptographic key to a transmitter 110 and a receiver 120. The quantum key distribution system 100 may include i) the transmitter 110 that divides an optical signal into a first optical signal passing through a first path P1 and a second optical signal passing through a second path P2, which is longer than the first path P1, and sequentially transmits the optical signals and ii) the receiver 120 that transmits the first optical signal and the second optical signal to the transmitter 110 through a quantum channel 130 after the first optical signal and the second optical signal incident through the quantum channel 130, pass through a polarization-dependent element 123, are reflected on a Faraday mirror 124, and then pass through the polarization-dependent element 123 again.

Here, in the quantum key distribution system 100 according to the embodiment of the present disclosure, the difference ($dL=L_{P2}-L_{P1}$) between the length $L_{P1}$ of the first path P1 and the length $L_{P2}$ of the second path P2 in the transmitter 110 is equal to or greater than twice the distance (=D) between the polarization-dependent element 123 and the Faraday mirror 124 ($dL \geq 2D$).

In the quantum key distribution system 100 in which an optical signal travels back and forth through the same optical link as in a two-way structure, according to an embodiment of the present disclosure, the receiver 120 is configured using the polarization-dependent element 123, and the polarization-dependent element 123 may be controlled using a one-time continuous control signal. Accordingly, it is not necessary to perform a non-continuous control signal two or more times. Therefore, the quantum key distribution system 100 according to an embodiment of the present disclosure corrects an error caused by a polarization-dependent characteristic.

Hereinafter, the quantum key distribution system 100 according to the embodiment of the present disclosure will be described in detail with reference to FIG. 3.

Figure 3:
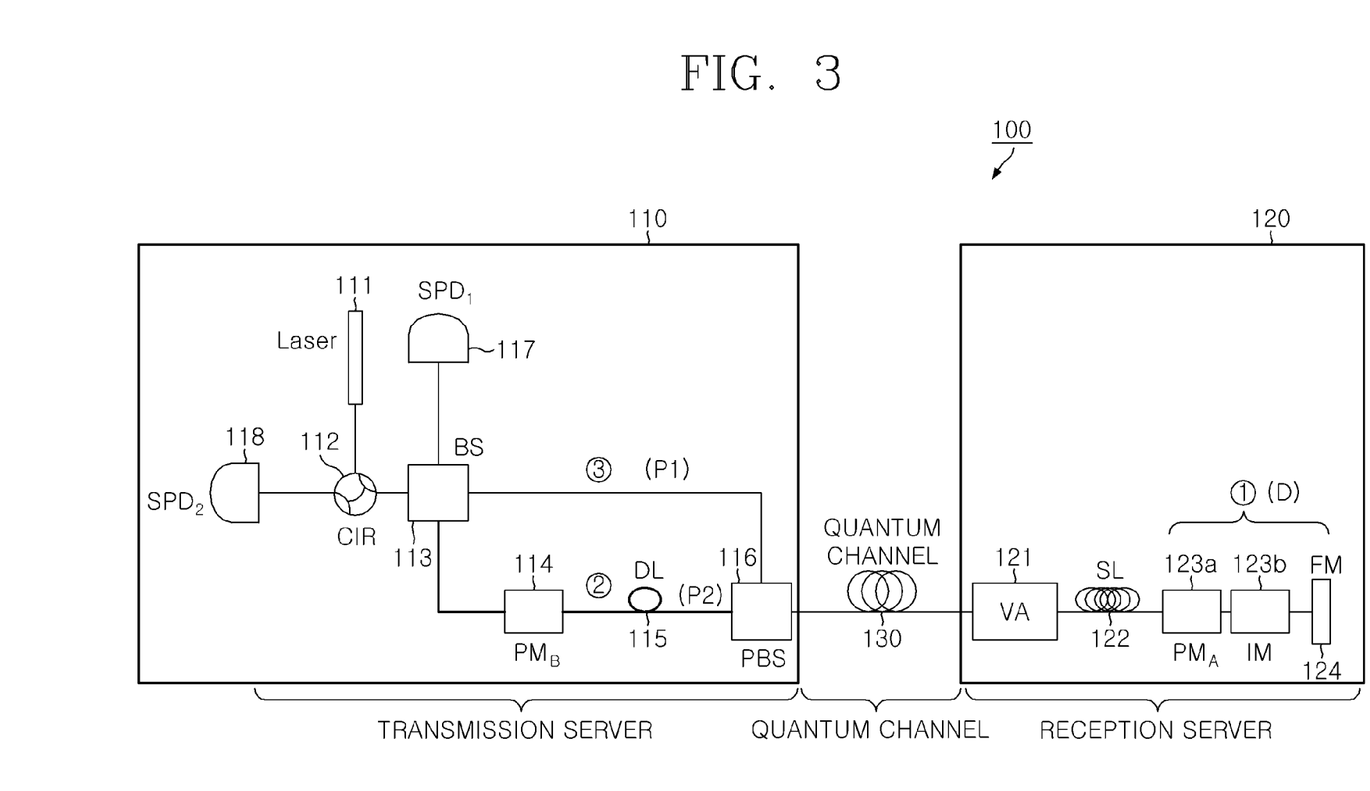
FIG. 3 illustrates a quantum key distribution system 100 in detail according to an embodiment of the present disclosure.

First, as illustrated in FIG. 3, the transmitter 110 may include a light source 111 and a beam splitter BS 113. The beam splitter BS 113 is connected to a first single photon detector (SPD1: 117) and a second single photon detector (SPD2: 118) through a circulator CIR 112. The light source 111 generates an optical signal. The beam splitter BS 113 splits the optical signal into a first optical signal and a second optical signal, outputs the first optical signal to a first path P1, and outputs the second optical signal to a second path P2.

A delay line DL 115 extending the propagation path of the second optical signal may be provided in the second path P2.

Further, as illustrated in FIG. 3, a polarized beam splitter PBS 116 may be provided in the transmitter 110 such that the first optical signal proceeding through the first path P1 may be polarized to have first polarization, and the second optical signal proceeding through the second path P2 may be polarized to have second polarization perpendicular to the first polarization.

Here, the polarized beam splitter 116 may enable the first optical signal transmitted from the receiver 120 to proceed to the second path P2 and enables the second optical signal to proceed to the first path P1.

As illustrated in FIG. 3, in the receiver 120, a one-time continuous control signal may be applied as a control signal for controlling the operation of the polarization-dependent element 123 while the first optical signal or the second optical signal passes through the polarization-dependent element 123 (e.g., a first phase modulator 123a and an intensity modulator 123b), is reflected on the Faraday mirror 124, and then passes through the polarization-dependent element 123 again.

As illustrated in FIG. 3, the receiver 120 may include a plurality of polarization-dependent elements 123. In this case, the difference ($dL=L_{P2}-L_{P1}$) between the length $L_{P1}$ of the first path P1 and the length $L_{P2}$ of the second path P2 may be equal to or greater than twice the distance (=D) between one (e.g., the first phase modulator 123a) of the polarization-dependent elements 123, which is distant from the Faraday mirror 124, and the Faraday mirror 124 ($dL \geq 2D$).

The receiver 120 may include the first phase modulator 123a and the intensity modulator 123b as the plurality of polarization-dependent elements 123, and the first phase modulator 123a may modulate only the phase of the second optical signal.

In addition, referring to FIG. 3, when a second phase modulator PMB 114 is positioned on the first path P1, the first phase modulator 123a in the receiver 120 may modulate only the phase of the first optical signal.

The receiver 120 may include the first phase modulator 123a and the intensity modulator 123b as the plurality of polarization-dependent elements 123, and the intensity modulator 123b may modulate the intensity of the first optical signal and the intensity of the second optical signal.

Hereinafter, regarding the quantum key distribution method, the quantum key distribution device, and the quantum key distribution system 100 according to the embodiment of the present disclosure, the operation of each individual component will be described in detail with reference to FIG. 3.

First, as illustrated in FIG. 3, in the transmitter 110 according to an embodiment of the present disclosure, an optical signal generated in the light source 111, such as a laser generation device, may be input to the beam splitter BS 113 via a circulator CIR 112.

The beam splitter 113 may split the input optical signal into a first optical signal and a second optical signal, transmit the first optical signal to the first path P1 that is a short path (③ of FIG. 3), and transmit the second optical signal to the second path P2 having the delay line DL (② of FIG. 3).

The first optical signal and the second optical signal are input to the quantum channel 130 via the polarized beam splitter PBS 116.

Here, due to the difference between the length $L_{P1}$ of the first path P1 and the length $L_{P2}$ of the second path P2 including the delay line 115, the second optical signal via the second path P2 is output to the quantum channel 130 at an interval of the difference ($dL=L_{P2}-L_{P1}$) between the length $L_{P2}$ of the second path P2 and the length $L_{P1}$ of the first path P1.

Further, the polarized beam splitter PBS 116 enables the output of the first optical signal having via the first path P1 to have vertical (V) polarization, and the output of the second optical signal via the second path P2 to have horizontal (H) polarization perpendicular to the polarization of the first optical signal.

The first optical signal and the second optical signal reaching the receiver 120 through the quantum channel 130 are distorted to have arbitrary polarizations V' and H', respectively, while passing through the quantum channel 130. The first optical signal and the second optical signal input to the receiver 120 reach the Faraday mirror FM 124 via a storage line SL, the first phase modulator $PM_A$ 123a, and the intensity modulator IM 123b.

Accordingly, since the Faraday mirror FM 124 reflects the polarizations of the incident first optical signal and second optical signal by rotating the same by 90 degrees, the polarization V' of the first optical signal, which is incident first, is reflected as being changed to H', and the polarization H' of the second optical signal, which is subsequently incident, is reflected as being changed to V'.

The first optical signal and the second optical signal reflected from the Faraday mirror FM 124 are input to the intensity modulator IM 123b and the first phase modulator PM$_A$ 123*a*. Accordingly, the intensity modulator IM 123*b* adjusts the strength of the optical signals to generate decoy data (decoy state).

Here, the intensity modulator IM 123*b* may modulate both the intensity of the first optical signal and the intensity of the second optical signal to generate the decoy data (decoy state).

The first phase modulator PM$_A$ 123*a* may change only the phase of the second optical signal among the optical signals incident to generate a cryptographic key. Accordingly, the phase of the second optical signal via the first phase modulator PM$_A$ 123*a* is changed from V' to V'a.

Subsequently, the first optical signal and the second optical signal are converted into single photons (or pseudo-single photons) via a variable attenuator VA 121, which are then transmitted back to the transmitter 110 through the quantum channel 130.

Accordingly, since the first optical signal and the second optical signal at a single photon level transmitted to the transmitter 110 are transmitted back through the same path as the optical channel used when first transmitted to the receiver 120, polarization distortion occurs to the same degree of polarization distortion in the transmission from the transmitter 110 to the receiver 120. Consequently, the polarization distortion occurring in the quantum channel 130 is offset to disappear.

As a result, the first optical signal reaches the transmitter 110 again with the polarization H' corrected to H, and the second optical signal reaches the transmitter 110 again with the polarization V'a corrected as Va.

Subsequently, the second optical signal, which is first transmitted through the second path P2 having the delay line DL of the transmitter 110, has the polarization rotated by 90 degrees by the Faraday mirror FM 124 and thus travels through the first path P1 by the polarized beam splitter PBS 116, while the first optical signal, which is transmitted through the first path P1, travels via the delay line DL 115 through the second path P2 by the polarized beam splitter PBS 116. As a result, the first optical signal and the second optical signal travel by the same distance with respect to the beam splitter BS 113 of the transmitter 110, thus reaching the beam splitter BS 113 at the same time, and cause interference according to a phase change by the first phase modulator PM$_A$ 123*a* and the second phase modulator PMB 114.

Here, in the receiver 120 of the quantum key distribution system 100, the first phase modulator PM$_A$ 123*a* and the intensity modulator (IM) 123*b*, which are polarization-dependent, perform two phase controls at each of entrance and exit to correct a polarization-dependent characteristic. Accordingly, since an optical signal entering the first phase modulator PM$_A$ 123*a* and the intensity modulator (IM) 123*b* and an optical signal exiting therefrom have a polarization difference of 90 degrees by the Faraday mirror (FM) 124, a phase control error due to polarization may be corrected by two phase controls.

However, in the quantum key distribution system 100, the first optical signal and the second optical signal transmitted from the transmitter 110 enter the receiver 120 at the interval of the difference (dL=L$_{P2}$−L$_{P1}$) between the length L$_{P1}$ of the first path P1 and the length L$_{P2}$ of the second path P2.

As illustrated in FIG. 3, a circuit of the receiver 120 may be configured by disposing the storage line SL 122, the first phase modulator PM$_A$ 123*a*, the intensity modulator IM 123*b*, and the Faraday mirror FM 124 in order.

Here, the polarization-dependent element 123 may be disposed regardless of order. That is, when the polarization-dependent element 123 and the Faraday mirror FM 124 are successively configured after the storage line SL 122 (①of FIG. 3), if the distance including the first phase modulator PM$_A$ 123*a*, the intensity modulator IM 123*b*, and the Faraday mirror FM 124 of the receiver 120 in this configuration is defined as D, and D is configured to be ½ of dL or shorter, the second optical signal does not reach the first phase modulator PM$_A$ 123*a* until the first optical signal passes through the first phase modulator PM$_A$ 123*a*, is reflected on the Faraday mirror FM 124, and then passes through the first phase modulator PM$_A$ 123*a* again.

Here, the positions of the first phase modulator PM$_A$ 123*a* and the intensity modulator IM 123*b* may be changed. Accordingly, when the intensity modulator IM 123*b* is positioned first, the second optical signal does not reach the intensity modulator IM 123*b* until the first optical signal passes through the intensity modulator IM 123*b*, is reflected on the Faraday mirror FM 124, and then passes through the intensity modulator IM 123*b* again.

In the receiver 120, the first phase modulator PM$_A$ 123*a* may operate only for the second optical signal. Accordingly, when D is configured to be ½ of dL or shorter, the first optical signal is not positioned between the first phase modulator PM$_A$ 123*a* and the Faraday mirror FM 124 until the second optical signal passes through the first phase modulator PM$_A$ 123*a*, is reflected on the Faraday mirror FM 124, and then enters the first phase modulator PM$_A$ 123*a* again.

Accordingly, to control the phase of the second optical signal and correct an error caused by polarization distortion using a one-time continuous control signal, when a control signal is applied to the first phase modulator PM$_A$ 123*a* for a time of T after the first optical signal leaves the first phase modulator PM$_A$ 123*a*, the second optical signal is subjected to phase control twice while entering the first phase modulator PM$_A$ 123*a*, being reflected on the Faraday mirror FM 124, and passing through the first phase modulator PM$_A$ 123*a* again for the time of T, thus offsetting a phase error due to polarization.

Here, T may be calculated by Equation 1.

$$T = 2N/c + E \quad (c: \text{speed of light in optical link}) \qquad \text{[Equation 1]}$$

Further, to generate decoy data (decoy state) in the receiver 120, the intensity modulator IM 123*b* needs to operate for both the first optical signal and the second optical signal. Accordingly, when a one-time continuous control signal is applied while the first optical signal and the second optical signal pass through the intensity modulator IM 123*b*, are reflected on the Faraday mirror FM 124, and then pass through the intensity modulator IM 123*b* again, the first optical signal and the second optical signal are subjected to control twice, thus offsetting a phase error due to polarization.

Mode for Carrying Out the Invention

Figure 4A:
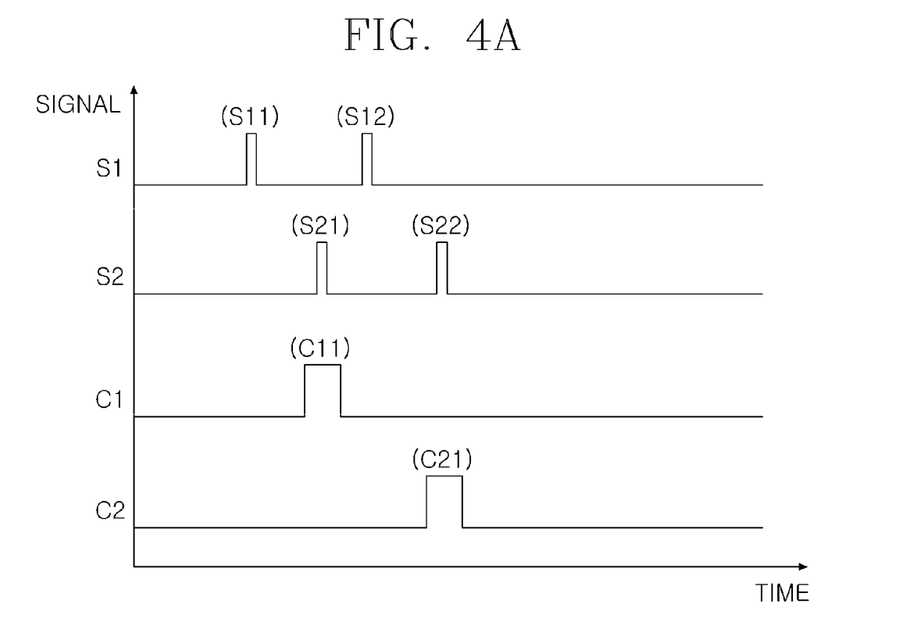
FIG. 4A and FIG. 4B are graphs illustrating a control signal for controlling a polarization-dependent element in a quantum key distribution system 100 according to an embodiment of the present disclosure.
Figure 4B:
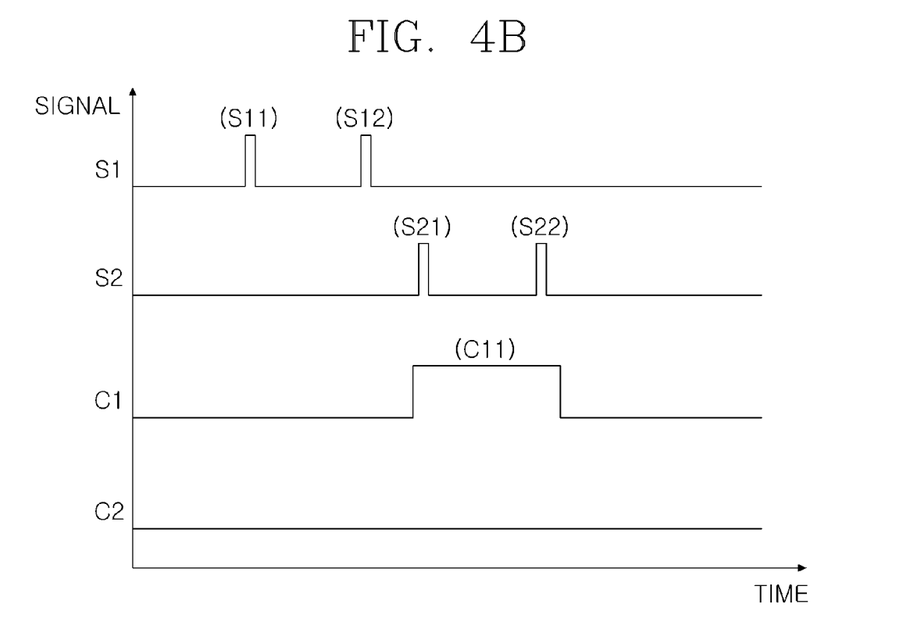

More specifically, FIG. 4A and FIG. 4B illustrate an optical signal and a control signal for controlling a polarization-dependent element in the quantum key distribution method, the quantum key distribution device, and the quantum key distribution system according to the embodiment of the present disclosure.

First, as illustrated in FIG. 4A, in a related art, since the first optical signal passes through the polarization-dependent element 123 (S12) between i) a time S21 when the second optical signal is input to the receiver 120 and passes through the polarization-dependent element 123 and ii) a time S22 when the second optical signal is reflected on the Faraday mirror 124 and passes through the polarization-dependent element 123 again, it is required to individually control S21 and S22 using separate high-speed control signals C11 and C12.

However, in the quantum key distribution method, the quantum key distribution device, and the quantum key distribution system according to the embodiment of the present disclosure, as illustrated in FIG. 4B, the first optical signal is not positioned between i) the time S21 when the second optical signal is input to the receiver 120 and passes through the polarization-dependent element 123 and ii) the time S22 when the second optical signal is reflected on the Faraday mirror 124 and passes through the polarization-dependent element 123 again. Therefore, it is possible to control S21 and S22 in combination using a single low-speed control signal C11 according to the embodients.

Hereinafter, the quantum key distribution method, the quantum key distribution device, and the quantum key distribution system according to the embodiment of the present disclosure will be described in more detail with reference to FIG. 3, FIG. 4A, and FIG. 4B.

Hereinafter, although a case where the phase modulator $PM_A$ 123a is provided as the polarization-dependent element 123 in the receiver 120 is described for illustration, the present disclosure is not necessarily limited thereto.

First, in the related art, when the second phase modulator PMB 114 is disposed on the second path P2 as in FIG. 3, as illustrated in FIG. 4A, after the first optical signal enters the receiver 120 (S1 of FIG. 4A), a first control signal is applied at a time when the second optical signal passes through the first phase modulator $PM_A$ 123a, thereby modulating the phase of the second optical signal (S21 of FIG. 4A).

In addition, the first control signal is applied again at a time when the second optical signal is reflected on the Faraday mirror FM 124 and then passes through the first phase modulator $PM_A$ 123a again, thereby modulating the phase of the second optical signal (S22 of FIG. 4A). Accordingly, the second optical signal is subjected to phase control twice while passing through the first phase modulator $PM_A$ 123a, thereby correcting a phase error by polarization.

However, as illustrated in FIG. 4A, the second optical signal may reach the first phase modulator $PM_A$ 123a before the first optical signal reaches the first phase modulator $PM_A$ 123a again after passing through the first phase modulator $PM_A$ 123a and being reflected on the Faraday mirror FM 124 (S21 of FIG. 4A).

Accordingly, in the related art, it is required, with respect to the first phase modulator $PM_A$ 123a, to apply a first control signal for the second optical signal at the time S21 and then remove the first control signal, and to apply a second control signal for the second optical signal at the time S22 and then remove the second control signal. Thus, to properly control the first optical signal and the second optical signal, it is required to accurately control the first optical signal and the second optical signal while quickly converting the control signals for the first phase modulator $PM_A$ 123a.

However, in the quantum key distribution method, the quantum key distribution apparatus, and the quantum key distribution system according to the embodiment of the present disclosure, the difference ($dL=L_{P2}-L_{P1}$) between the length $L_{P1}$ of the first path P1 and the length $L_{P2}$ of the second path P2 in the transmitter 110 is equal to or greater than twice the distance (=D) between the polarization-dependent element 123 and the Faraday mirror 124 ($dL \geq 2D$). Therefore, the polarization-dependent element 123 may be controlled using a one-time continuous control signal, and an error caused by the polarization-dependent characteristic may be corrected.

More specifically, as illustrated in FIG. 4B, in the present disclosure, the second optical signal cannot reach the phase modulator $PM_A$ 123a until the first optical signal entering the receiver 120 passes through the first phase modulator $PM_A$ 123a (S11 of FIG. 4B), is reflected on the Faraday mirror FM 124, and then pass through the first phase modulator $PM_A$ 123a again (S12 of FIG. 4B)

Accordingly, since the first optical signal has already passed through the first phase modulator $PM_A$ 123a at the time when the second optical signal enters the receiver 120, the first phase modulator $PM_A$ 123a may be controlled using a one-time continuous control signal for the second optical signal as illustrated in FIG. 4B, thereby effectively correcting an error by the polarization-dependent characteristic (C11 of FIG. 4B).

Hereinafter, although a case where the intensity modulator IM 123b is provided as the polarization-dependent element 123 in the receiver 120 is described for illustration, the present disclosure is not necessarily limited thereto.

First, in the related art, as illustrated in FIG. 4A, when the first optical signal enters the receiver 120 (S1 of FIG. 4A), a first control signal is applied at a time when the first optical signal passes through the intensity modulator IM 123b, thereby modulating the intensity of the first optical signal (S11 of FIG. 4A).

In addition, the first control signal is applied again at a time when the first optical signal is reflected on the Faraday mirror FM 124 and then passes through the intensity modulator IM 123b again, thereby modulating the intensity of the first optical signal (S12 of FIG. 4A). Accordingly, the first optical signal is subjected to phase control twice while passing through the intensity modulator IM 123b, thereby correcting a phase error by polarization.

However, as illustrated in FIG. 4A, the second optical signal may reach the intensity modulator IM 123b before the first optical signal reaches the intensity modulator IM 123b again after passing through the intensity modulator IM 123b and being reflected on the Faraday mirror FM 124 (S21 of FIG. 4A).

Accordingly, in the related art, it is required, with respect to the intensity modulator IM 123b, to apply a first control signal for the first optical signal at the time S11 of FIG. 4A and then remove the first control signal, and to apply a second control signal for the second optical signal at the time S21 of FIG. 4A and then remove the second control signal. Thus, to properly control the first optical signal and the second optical signal, it is required to accurately control the first optical signal and the second optical signal while quickly converting the control signals for the intensity modulator IM 123b.

However, in the quantum key distribution method, the quantum key distribution apparatus, and the quantum key distribution system according to the embodiment of the present disclosure, the difference ($dL=L_{P2}-L_{P1}$) between the length $L_{P1}$ of the first path P1 and the length $L_{P2}$ of the second path P2 in the transmitter 110 is equal to or greater than twice the distance (=D) between the polarization-dependent element 123 and the Faraday mirror 124 ($dL \geq 2D$). Therefore, the polarization-dependent element 123 may be controlled using a one-time continuous control signal, and thus an error caused by the polarization-dependent characteristic may be corrected according to the embodiment.

Accordingly, in the two-way quantum key distribution system 100 according to the present disclosure, the receiver 120 and the transmitter 110 are designed such that, for example, by adjusting the length of the delay line DL 115 of an interferometer disposed in the transmitter 110 and the interval between the Faraday mirror FM 124 and the first phase modulator $PM_A$ 123a and the intensity modulator IM 123b disposed in the receiver 120, the first optical signal among the first optical signal and the second optical signal transmitted by the transmitter 110 is reflected by the Faraday mirror FM 124, and then can exit from the first phase modulator $PM_A$ 123a of the receiver 120 before the second optical signal reaches the first phase modulator $PM_A$ 123a of the receiver 120 so that the first optical signal is not affected while the second optical signal is affected by the first phase modulator $PM_A$ 123a and the intensity modulator IM 123b.

Although the case of controlling the first optical signal and the second optical signal, for example, using the first phase modulator 123a and the intensity modulator 123b has been described, the present disclosure is not necessarily limited thereto, and various other polarization-dependent elements 123 may be employed.

Figure 5A:
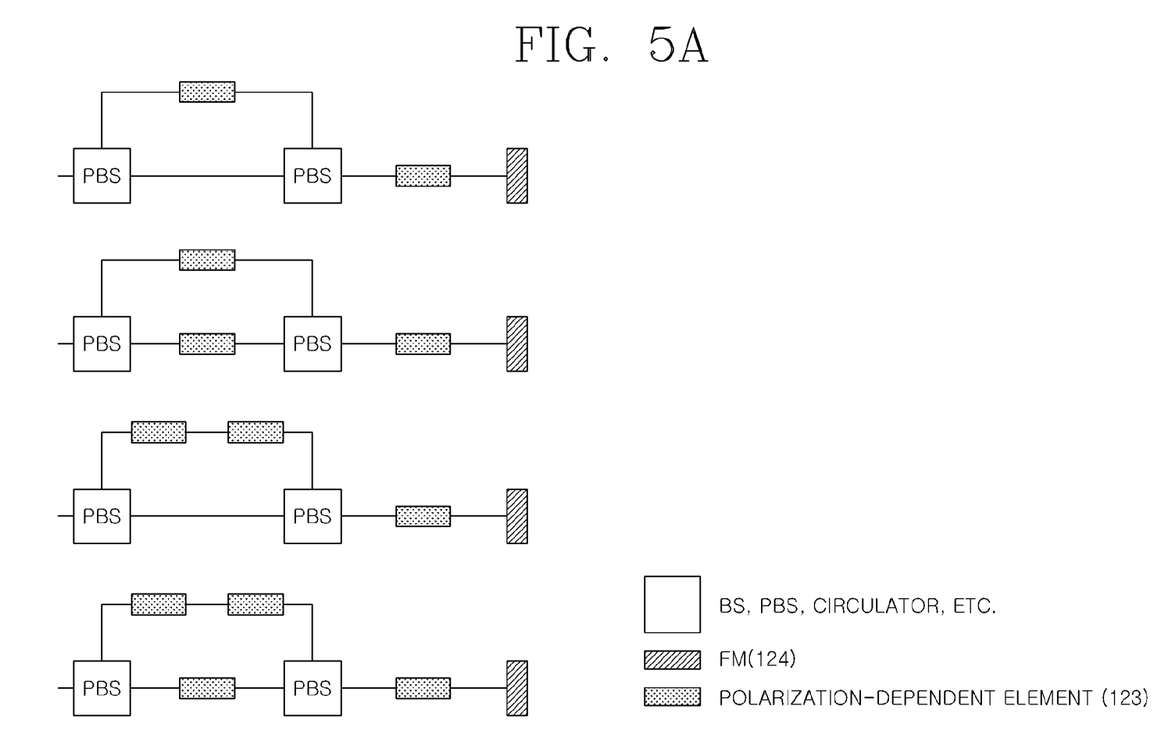
FIG. 5A and FIG. 5B illustrate arrangement of a polarization-dependent element 123 of a receiver 120 in a quantum key distribution system 100 according to an embodiment of the present disclosure.
Figure 5B:
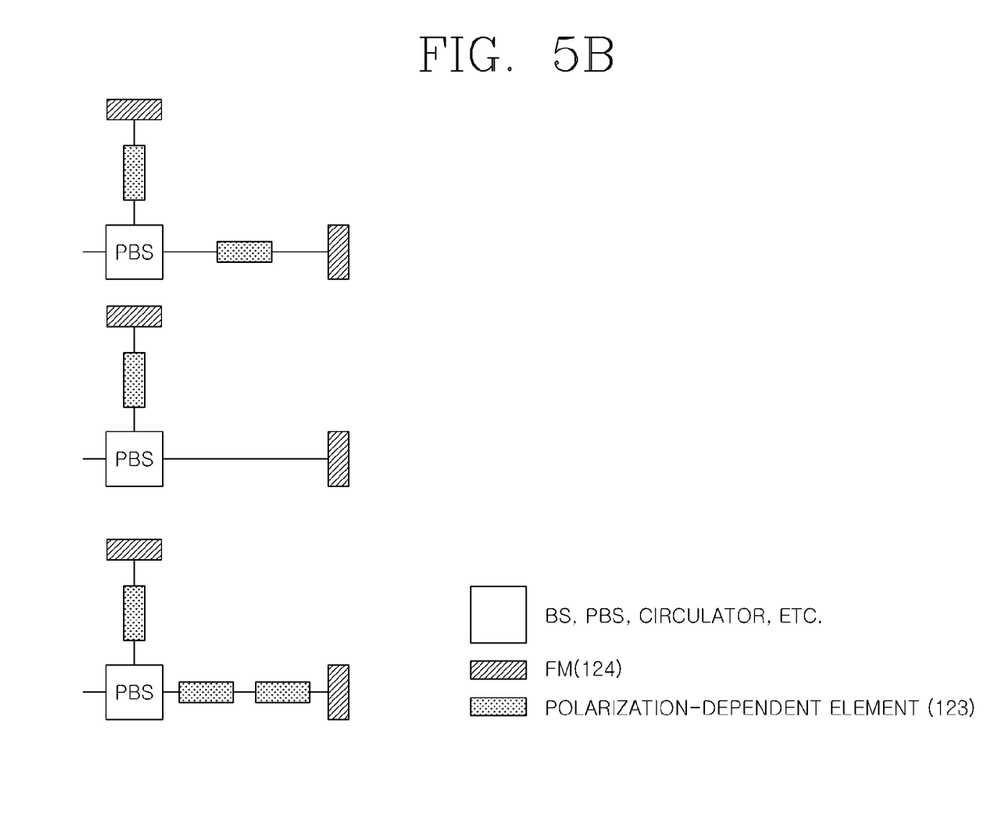

Furthermore, in the quantum key distribution system 100 according to the embodiment of the present disclosure, although the plurality of polarization-dependent elements 123 of the receiver 120 may be successively disposed as illustrated in FIG. 3 (the first phase modulator 123a and the intensity modulator 123b of FIG. 3), the plurality of polarization-dependent elements 123 may be configured in various forms, such as being disposed apart using an optical element, for example, a beam splitter BS (FIG. 5A) or a circulator (FIG. 5B), to separate an optical link or to change a direction as illustrated in FIG. 5A and FIG. 5B. Here, each polarization-dependent element 123 may individually modulate the first optical signal and the second optical signal depending on purposes or may modulate both the first optical signal and the second optical signal.

Figure 6:
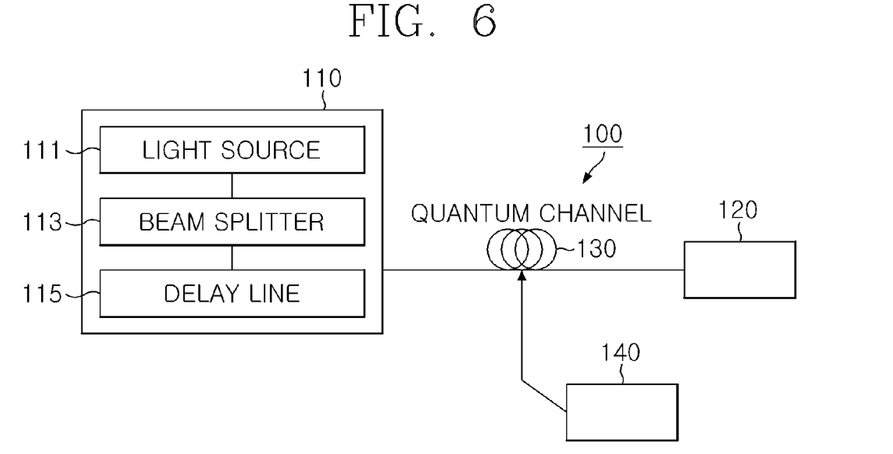
FIG. 6 and FIG. 7 illustrate a transmitter 110 and a receiver 120 in a quantum key distribution system 100 according to an embodiment of the present disclosure.
Figure 7:
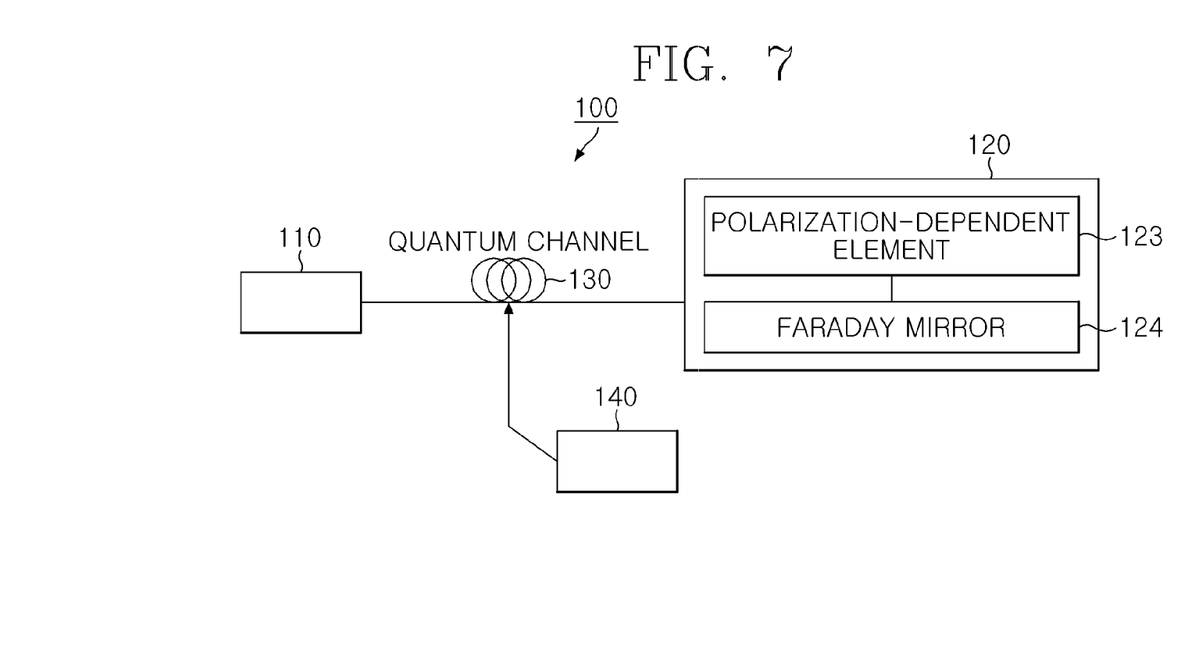

FIG. 6 illustrates the transmitter 110 of the quantum key distribution system 100 according to an embodiment of the present disclosure, and FIG. 7 illustrates the receiver 120 of the quantum key distribution system 100 according to an embodiment of the present disclosure.

Since the transmitter 110 and the receiver 120 have been explained in detail in the foregoing description of the quantum key distribution system 100 according to the embodiment of the present disclosure, the gist of the configuration and operation of the transmitter 110 and the receiver 120 of the quantum key distribution system 100 according to an embodiment of the present disclosure will be described hereinafter.

First, as illustrated in FIG. 6, the transmitter 110 may distribute a quantum cryptographic key with the receiver 120. The transmitter 110 may include i) a light source 111 that generates an optical signal, ii) a beam splitter 113 that splits the optical signal into a first optical signal and a second optical signal, outputs the first optical signal to a first path P1, and outputs the second optical signal to a second path P2, and iii) a delay line 115 provided in the second path P2 to extend the propagation path of the second optical signal.

Here, the difference ($dL=L_{P2}-L_{P1}$) between the length $L_{P1}$ of the first path P1 and the length $L_{P2}$ of the second path P2 is equal to or greater than twice the distance (=D) between a polarization-dependent element 123 and a Faraday mirror 124 provided in the receiver 120 (dL≥2D).

As illustrated in FIG. 7, the receiver 120 may distribute a quantum cryptographic key with the transmitter 110. The receiver 120 may include i) a polarization-dependent element 123 of which an operation characteristic changes depending on polarization of an optical signal and ii) a Faraday mirror 124 that reflects an entering optical signal by rotating polarization of the optical signal by 90 degrees. Here, when an optical signal generated in the transmitter 110 is split into a first optical signal passing through a first path P1 and a second optical signal passing through a second path P2, which is longer than the first path P1, and the first optical signal and the second optical signal are sequentially transmitted, the first optical signal and the second optical signal incident through a quantum channel 130 are reflected on the Faraday mirror 124 via the polarization-dependent element 123, pass through the polarization-dependent element 123 again, and are then transmitted to the transmitter 110 through the quantum channel 130.

Here, the difference ($dL=L_{P2}-L_{P1}$) between the length $L_{P1}$ of the first path P1 and the length $L_{P2}$ of the second path P2 in the transmitter 110 is equal to or greater than twice the distance (=D) between a polarization-dependent element 123 and a Faraday mirror 124 (dL≥2D).

According to the embodiment, the receiver 120 is configured using the polarization-dependent element 123 in the quantum key distribution system 100 in which an optical signal travels back and forth through the same optical link as in a two-way structure. Therefore, the quantum key distribution system 100 according to the embodiment may control the polarization-dependent element 123 using a one-time continuous control signal, thereby correcting an error caused a polarization-dependent characteristic.

The foregoing description is provided merely to explain the technical idea of the present disclosure, and it will be apparent to those having ordinary skill in the art to which this disclosure belongs that various modifications and variations can be made in the present disclosure without departing from the essential characteristics of the present disclosure. The embodiments disclosed herein are provided not to limit but to describe the technical idea of the present disclosure and do not limit the scope of the present disclosure. The scope of the present disclosure should be construed as being defined by the appended claims, and any technical ideas within the appended claims and their equivalents should be construed as being included in the scope of the present disclosure.

The invention claimed is:

1. A quantum key distribution system for distributing a quantum cryptographic key to a transmitter and a receiver, the quantum key distribution system comprising:
   the transmitter configured to split an optical signal into a first optical signal passing through a first path (P1) and a second optical signal passing through a second path (P2), which is longer than the first path (P1), and to sequentially transmit the first optical signal and the second optical signal; and
   the receiver configured to receive the first optical signal and the second optical signal incident through a quantum channel and transmit the first optical signal and the second optical signal back to the transmitter passing through the quantum channel after passing through a polarization-dependent element, being reflected by a Faraday mirror, and passing through the polarization-dependent element again,
   wherein a difference ($dL=L_{P2}-L_{P1}$) between a length ($L_{P1}$) of the first path (P1) and a length ($L_{P2}$) of the second path (P2) in the transmitter is equal to or greater than twice a distance (=D) between the polarization-dependent element and the Faraday mirror (dL>2D).

2. The quantum key distribution system of claim 1, wherein the transmitter comprises a light source configured to generate an optical signal and a beam splitter configured to split the optical signal into the first optical signal and the second optical signal, to output the first optical signal to the first path (P1), and to output the second optical signal to the second path (P2).

3. The quantum key distribution system of claim 2, wherein a delay line extending a propagation path of the second optical signal is provided in the second path (P2).

4. The quantum key distribution system of claim 1, wherein a polarized beam splitter is provided in the transmitter to polarize the first optical signal proceeding through the first path (P1) to have first polarization and to polarize the second optical signal proceeding through the second path (P2) to have second polarization perpendicular to the first polarization.

5. The quantum key distribution system of claim 4, wherein the polarized beam splitter enables the first optical signal transmitted from the receiver to proceed to the second path (P2) and enables the second optical signal to proceed to the first path (P1).

6. The quantum key distribution system of claim 1, wherein, in the receiver, while the first optical signal or the second optical signal passes through the polarization-dependent element, is reflected on the Faraday mirror, and then passes through the polarization-dependent element again, a one-time continuous control signal is applied as a control signal for controlling an operation of the polarization-dependent element.

7. The quantum key distribution system of claim 1, wherein the receiver comprises a plurality of polarization-dependent elements, and
the difference ($dL=L_{P2}-L_{P1}$) between the length ($L_{P1}$) of the first path (P1) and the length ($L_{P2}$) of the second path (P2) is equal to or greater than twice a distance (=D) between one of the polarization-dependent elements which is distant from the Faraday mirror and the Faraday mirror ($dL \geq 2D$).

8. The quantum key distribution system of claim 7, wherein the plurality of polarization-dependent elements comprises a first phase modulator and an intensity modulator, and
the first phase modulator modulates only a phase of the second optical signal.

9. The quantum key distribution system of claim 7, wherein the plurality of polarization-dependent elements comprises a first phase modulator and an intensity modulator, and
the intensity modulator modulates an intensity of the first optical signal and an intensity of the second optical signal.

10. A transmitter provided in a quantum key distribution system to distribute a quantum cryptographic key with a receiver, the transmitter comprising:
a light source configured to generate an optical signal;
a beam splitter configured to split the optical signal into a first optical signal and a second optical signal, to output the first optical signal to a first path (P1), and to output the second optical signal to a second path (P2); and
a delay line provided in the second path (P2) to extend a propagation path of the second optical signal,
wherein a difference ($dL=L_{P2}-L_{P1}$) between a length ($L_{P1}$) of the first path (P1) and a length ($L_{P2}$) of the second path (P2) is equal to or greater than twice a distance (=D) between a polarization-dependent element and a Faraday mirror provided in the receiver ($dL \geq 2D$).

11. A receiver provided in a quantum key distribution system to distribute a quantum cryptographic key with a transmitter, the receiver comprising:
a polarization-dependent element having an operation characteristic that changes depending on polarization of an optical signal; and
a Faraday mirror configured to reflect an entering optical signal by rotating polarization of the optical signal by 90 degrees,
wherein, the transmitter generates an optical signal, splits the optical signal into a first optical signal passing through a first path (P1) and a second optical signal passing through a second path (P2), which is longer than the first path (P1), and transmits the first optical signal and the second optical signal sequentially to the receiver 120, and the receiver receives the first optical signal and the second optical signal incident through a quantum channel and transmits the first optical signal and the second signal back to the transmitter through the quantum channel after passing the polarization-dependent element, being reflected on the Faraday mirror, and passing through the polarization-dependent element again, and
a difference ($dL=L_{P2}-L_{P1}$) between a length ($L_{P1}$) of the first path (P1) and a length ($L_{P2}$) of the second path (P2) in the transmitter is equal to or greater than twice a distance (=D) between the polarization-dependent element and the Faraday mirror ($dL \geq 2D$).

\* \* \* \* \*